US006989352B2

(12) United States Patent
Fisk, Jr. et al.

(10) Patent No.: US 6,989,352 B2
(45) Date of Patent: Jan. 24, 2006

(54) SILICIC ACID MUD LUBRICANTS

(75) Inventors: James V. Fisk, Jr., Houston, TX (US); Jim D. Kerchevile, Houston, TX (US); Kenneth W. Pober, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 227 days.

(21) Appl. No.: 10/167,882

(22) Filed: Jun. 12, 2002

(65) Prior Publication Data

US 2003/0232726 A1 Dec. 18, 2003

(51) Int. Cl.
*C09K 7/02* (2006.01)

(52) U.S. Cl. .................... 507/110; 507/139; 507/140; 507/145; 507/136

(58) Field of Classification Search ................ 507/110, 507/139, 140, 145, 136
See application file for complete search history.

(56) References Cited

U.S. PATENT DOCUMENTS

| | | | |
|---|---|---|---|
| 3,547,828 A * | 12/1970 | Mansfield et al. ............ 516/72 |
| 5,205,959 A * | 4/1993 | Schmid et al. .............. 510/422 |
| 5,436,227 A * | 7/1995 | Hale et al. .................. 507/136 |
| 5,602,082 A * | 2/1997 | Hale et al. .................. 507/115 |
| 5,646,258 A * | 7/1997 | Gruning et al. ............ 536/18.6 |
| 5,696,074 A * | 12/1997 | Nickel et al. ............... 510/470 |
| 5,874,386 A * | 2/1999 | Chan et al. ................. 507/211 |
| 2003/0092579 A1 * | 5/2003 | Albrecht et al. ............ 507/100 |

FOREIGN PATENT DOCUMENTS

| WO | WO 86/05187 A1 * | 9/1986 |
|---|---|---|
| WO | WO 01/81498 A2 | 11/2001 |

\* cited by examiner

*Primary Examiner*—Philip C. Tucker
(74) *Attorney, Agent, or Firm*—Craig W. Roddy; Karen B. Tripp

(57) ABSTRACT

A lubricant for use in silicic acid muds and other drilling fluids comprising silicate or silica species is disclosed. The lubricant significantly improves the lubricity of the fluid. A method of drilling a wellbore in a subterranean formation employing the lubricant is also disclosed. A preferred lubricant of the invention comprises about 80 volume percent 2-octyldodecanol and about 20 volume percent alkylglucoside. The alkylglucoside is preferably comprised of 2-ethylhexylglucoside or a mixture of alkylglucosides having more than about 10 carbon atoms in the alkyl chain.

26 Claims, No Drawings

SILICIC ACID MUD LUBRICANTS

BACKGROUND OF THE INVENTION

1. Field of the Invention

This invention is related to drilling wellbores in subterranean formations and to methods and compositions for lubricating drilling apparatus used to accomplish such drilling. Particularly, this invention relates to drilling fluids or muds and more particularly to lubricants for silicic acid muds.

2. Description of Relevant Art

Rotary drilling methods employing a drill bit and drill stems have long been used to drill wellbores in subterranean formations. Drilling fluids or muds are commonly circulated in the well during such drilling to cool and lubricate the drilling apparatus, lift cuttings out of the wellbore, and counterbalance the subterranean formation pressure encountered. An important function of drilling fluid is to reduce the considerable torque on the rotating drill stem caused by the friction between the outside of the drill pipe comprising the drill stem and the wall of the well and/or casing strings. Drilling through offsets and highly deviated or horizontal wells results in increased frictional forces, increasing the demand on the lubricating properties of the drilling fluids.

The lubrication characteristics of drilling fluids have been studied and a number of patents disclose additives for oil based drilling fluids and aqueous based drilling fluids. Many oil based fluids, or additives for such fluids, have caused environmental concerns and tend to be more costly than aqueous based fluids. Consequently, aqueous based fluids are often preferred. However, aqueous based fluids tend to have more lubricity problems and adverse effects on the subterranean formation, such as causing swelling of clays, than encountered with oil based fluids.

Silicate drilling fluids, or more specifically, aqueous based fluids containing silicate additives, have long been known to inhibit formation damage caused by water but have also long been known to have poor lubricity properties. Lubricants commonly known and used in water based muds do not provide good lubricity in silicate muds.

Recently, silicic acid based drilling fluids have been found to have advantageous inhibitive effects similar to silicate drilling fluids and moreover have been found to also provide a membrane-efficient water-based mud. See international patent application no. PCT/US00/35686 of Halliburton Energy Services, Inc. and the Commonwealth Scientific and Industrial Research Organisation and inventors Fersheed K. Mody, Kenneth W. Pober (also co-inventor of the present invention), and others, filed Dec. 30, 2000. However, silicic acid based drilling fluids have high torque and drag values. Moreover, traditional mud lubricants show little to no effect in a high pH silicic acid mud.

There is a need for a silicic acid based aqueous drilling fluid or mud system with improved lubricity or for lubricants that provide lubricity in silicic acid muds.

SUMMARY OF THE INVENTION

The present invention provides a silicic acid mud lubricant, and a drilling fluid comprising such lubricant, for use in drilling wellbores in subterranean formations. The invention further comprises a method of drilling a wellbore in a subterranean formation using drilling fluids comprising silicic acid and the silicic acid mud lubricant of this invention. The invention is particularly suited for use in drilling wellbores in hydrocarbon bearing subterranean formations.

The silicic acid mud lubricant of the invention comprises low solubility alcohol, most preferably 2-octyldodecanol, and an alkylglucoside or mixture of alkylglucosides, preferably Fr, having between about 4 to about 20 carbon atoms in the alkyl chain. The most preferred lubricant compositions comprise about 80 volume percent 2-octyldodecanol and about 20 volume percent of either 2-ethylhexylglucoside or a mixture of alkylglucosides having more than about 10 carbon Ri:Jr atoms in the alkyl chain (but preferably less than about 20 carbon atoms in the alkyl chain). As used herein, the terms "glucoside" and "alkylglucoside" are synonymous with the terms "glycoside" and "alkylglycoside" respectively.

DETAILED DESCRIPTION OF THE PREFERRED EMBODIMENTS

In the present invention, an aqueous drilling fluid is prepared comprising silicic acid and the silicic acid mud lubricant of the invention and is used in drilling a wellbore or borehole in a subterranean formation. The quantity of silicic acid in the drilling fluid sufficient to characterize the fluid as a "silicic acid based drilling fluid" or "silicic acid based mud" is generally at least about two percent by weight of the mud liquid phase. A typical general use rate for silicic acid, for example, might be about two to about ten percent by weight silicic acid based on weight of liquid phase present, but this invention is not limited to this quantity range. The aqueous base of the fluid is preferably brine, although fresh water may also be used.

Table 1 sets forth an example composition of a silicic acid-based mud. In this example, the mud is weighted with barite to be a 12 lb/gal mud. Those skilled in the art will appreciate that many variations in the composition comprising a silicic acid based mud (as with any drilling fluid) are possible and may alternatively be used in this invention.

TABLE 1

EXAMPLE SILIC ACID MUD

Formula

| | |
|---|---|
| Silicic Acid Base* | 0.92 bbl |
| BARAZAN ® D PLUS | 0.75 lb |
| N DRIL ® HT PLUS | 5.0 lb |
| Rev Dust | 20 lb |
| Barite | 117 lb |
| ALDACIDE ® G | 0.25 lb |

*Silicic Acid Base (20% NaCl, 5% Silicic Acid was prepared using the following composition:

| | |
|---|---|
| Water | 0.8945 bbl |
| NaCl | 78.84. lb |
| Commercial Silicic Acid | 17.24 lb |
| NaOH | 11.34 lb |

Properties

FANN ® 35 at 75° F.:

| | |
|---|---|
| 600 rpm | 84 |
| 300 rpm | 56 |
| 200 rpm | 48 |
| 100 rpm | 35 |
| 6 rpm | 11 |
| 3 rpm | 10 |
| Plastic Viscosity, cp | 28 |
| Yield Point, lb/100 sq ft | 28 |
| 10 sec gel, lb/100 sq ft | 10 |

TABLE 1-continued

EXAMPLE SILIC ACID MUD

| 10 min gel, lb/100 sq ft | 13 |
|---|---|
| pH | 11.4 |
| API Filtrate, ml | 2.4 |

BARAZAN ® D PLUS, N DRIL ® HT PLUS, ALDACIDE ® G are trademarks of Halliburton Energy Services, Inc. and designate products available from Halliburton Energy Services, Inc. in Houston, Texas. Rev Dust (artificial drill solids known to those skilled in the art) is available from Milwhite, Inc. in Houston, Texas. FANN ® is a trademark of FANN Instruments, a sub-sidiary of Halliburton, in Houston, Texas.

The silicic mud lubricant of the present invention comprises a mixture or blend of an alcohol and an alkylglucoside. Preferably, the alkylglucoside is 2-ethylhexylglucoside or a mixture of different alkylglucosides, such as a preferred mixture of butyl and hexyl glucosides or an alternative preferred mixture of alkylglucosides having more than about 10 carbon atoms in the alkyl chain (but preferably fewer than about 20 carbon atoms in the alkyl chain). Alkylglucosides are available commercially from Seppic in New Jersey and the Societe D'Exploitation de Produits Pour Les Industries Chimiques Seppic, Societe Anonyme, in Paris, France. Of the commercially available alkylglucosides, Seppic SIMULSOL AS-48™ and Seppic SIMULSOL SL-55™ are preferred for use in the invention. The preferred alcohol is 2-octyldodecanol. Other alcohols demonstrating low solubility (i.e., approaching little if any solubility) in water and tolerance (i.e., stability) in a base environment may alternatively be used. Such alternative alcohols include oleyl and stearyl alcohols, and selected polyetherglycols such as DOW® LB-1715 and SYNALOX® PB-200, both available from the Dow Chemical Company in Midland, Mich.

For the lubricant of the present invention to be effective, that is, for the lubricant of the present invention to provide lubricity to silicic acid based muds, the lubricant must be a mixture. The alcohol alone will not provide the desired lubricity; neither will the alkylglucoside alone. Amounts of alcohols in the range of about 90 volume percent to about 40 volume percent and amounts of alkylglucosides in the range of about 10 volume percent to about 60 volume percent are believed to be sufficient quantities to comprise an effective silicic acid lubricant. The preferred ratio is about 80 volume percent alcohol to about 20 volume percent alkylglucoside.

Without wishing to be limited by theory, it is presently believed that the alcohol present in the lubricant mixture serves as the more active lubricant and the alkylglucoside present serves primarily as a wetting agent. An advantage of the alkylglucosides is that they are believed to have this wetting capability even in a high pH environment. The lubricant of the present invention is advantageously effective in a high pH environment, has low toxicity, and is environmentally acceptable.

The quantity of silicic acid mud lubricant of the invention added to the silicic acid mud may generally or preferably be in the range of about 4 to about 24 pounds per barrel. The actual amount of lubricant used depends upon operating conditions. In the course of drilling, some amount of lubricant is expected to be lost to drill solids. That is, some lubricant is expected to adsorb onto fresh drill cuttings which will then be separated out of the system by surface solids control equipment. For example, if an inert shale is being drilled with good solids control equipment, a lower level of lubricant, about four to about fourteen pounds per barrel, may typically be used. For another example, if an active, smectite-like shale is being drilled with poor solids control, about fourteen to about twenty-four pounds per barrel lubricant may typically be used.

Lubricity tests were conducted using two example lubricants of the invention in example silicic acid muds having different weights, with and without drill solids, and having variable temperature exposure. The tests results are discussed below.

EXPERIMENTS

Samples of silicic acid based mud were prepared generally comprising 20% by weight sodium chloride, 5% by weight active silicic acid, caustic to dissolve the silicic acid, and polymers for suspension and fluid loss. For a few samples, 2% potassium carbonate was substituted for the 20% sodium chloride in the silicic acid base. The density of the mud samples was varied by adding different amounts of barite, or no barite, as known to those skilled in the art. Also, some samples of mud were prepared without Rev Dust and some were prepared with Rev Dust to simulate the presence of drill cuttings in the mud. One of two example lubricants of the invention was added to some samples and not to others. The two example lubricants of the invention had the following compositions:

Exp. Lub. I: 80% vol. 2-octyldodecanol and 20% vol. Seppic SIMULSOL AS-48 (2-ethylhexylglucoside);

Exp. Lub. II: 80% vol. 2-octyldodecanol and 20% vol. Seppic SIMULSOL SL-55 (mixture of >$C_{10}$ alkylglucosides).

More detailed information about the composition of the mud samples is provided in Tables 2, 3, 4 and 5.

Mud properties and lubricity coefficients were measured and recorded for the various samples as shown in the tables below. Some of the samples (without lubricant or with Exp. Lub. I or II) were then heated for 16 hours overnight at 150 degrees Fahrenheit and cooled to ambient temperature. The lubricity and mud properties were then measured and recorded as shown in the tables below. Some of these same samples were then heated at 250 degrees Fahrenheit for 16 hours, cooled to ambient temperature, and the lubricity and mud properties measured and recorded again as shown in the tables below.

For further illustration of the test results and the improvement in lubricity provided by the lubricants of the present invention, the lubricity measurements taken for the samples have been copied from Tables 2, 3, 4, and 5 above and compiled together in Tables 6, 7, 8 and 9 respectively below.

The samples in Tables 2 and 6 provide an unweighted (10 lb/gal) system, with and without "Rev Dust" or drill solids. The samples in Tables 3 and 7 provide a system weighted with barite to 12.0 lb/gal. density, with and without "Rev Dust" or drill solids. The samples in Tables 4 and 8 provide a system weighted with barite to 14.0 lb/gal. density, with and without "Rev Dust" or drill solids. Together, these samples in Tables 6, 7, and 8 provide a grid of a silicic acid mud system at low, medium, and high weight, each with or without drill solids, at temperature exposures of 75 degrees, 150 degrees and 250 degrees Fahrenheit—to characterize the application range of a typical silicic acid based mud system with Exp. Lub I.

Table 5 is directed to tests with silicic acid based mud samples comprising potassium carbonate without sodium chloride, and with and without Exp. Lub I or Exp. Lub II. Table 9 compiles the results of the tests showing the lubricity effects of Exp. Lub II on a silicic acid based mud comprising potassium carbonate with no sodium chloride present and with and without "Rev Dust" or drill solids, at temperature exposures of 75 degrees and 150 degrees Fahrenheit.

TABLE 2

EXP. LUB. I IN UNWEIGHTED SILICIC ACID MUD

| Sample | A | A | A | B | B | B | C | C | C | D | D | D |
|---|---|---|---|---|---|---|---|---|---|---|---|---|
| (a) Composition/Test Conditions ||||||||||||| 
| Silicic Acid Mud, bbl | 1.0 | 1.0 | 1.0 | 1.0 | 1.0 | 1.0 | 1.0 | 1.0 | 1.0 | 1.0 | 1.0 | 1.0 |
| Exp. Lub. I, vol. % | — | — | — | 3 | 3 | 3 | — | — | — | 3 | 3 | 3 |
| Rev. Dust, lb | — | — | — | — | — | — | 25 | 25 | 25 | 25 | 25 | 25 |
| Stirred, min | 15 | 15 | 15 | 15 | 15 | 15 | 15 | 15 | 15 | 15 | 15 | 15 |
| Rolled at 150° F., hr | 0 | 16 | 16 | 0 | 16 | 16 | 0 | 16 | 16 | 0 | 16 | 16 |
| Rolled at 250° F., hr | 0 | 0 | 16 | 0 | 0 | 16 | 0 | 0 | 16 | 0 | 0 | 16 |
| Lubricity Coefficient | Off Scale | Off Scale | Off Scale | 0.16 | 0.07 | 0.11 | 0.26 | Off Scale | Off Scale | 0.17 | 0.26 | 0.22 |
| (b) Properties |||||||||||||
| Fann 35, Temp. ° F. | 120 | 120 | 120 | 120 | 120 | 120 | 120 | 120 | 120 | 120 | 120 | 120 |
| 600 rpm | 39 | 35 | 8 | 40 | 37 | 10 | 40 | 40 | 9 | 46 | 45 | 17 |
| 300 rpm | 26 | 25 | 5 | 27 | 27 | 6 | 28 | 27 | 5 | 35 | 35 | 11 |
| 200 rpm | 22 | 20 | 4 | 23 | 22 | 4 | 24 | 22 | 4 | 30 | 29 | 5 |
| 100 rpm | 18 | 15 | 2 | 19 | 18 | 3 | 20 | 18 | 2 | 25 | 25 | 3 |
| 6 rpm | 8 | 5 | 0 | 8 | 8 | 1 | 9 | 10 | 2 | 10 | 10 | 2 |
| 3 rpm | 6 | 4 | 1 | 6 | 7 | 1 | 7 | 8 | 1 | 9 | 9 | 2 |
| Plastic viscosity, cP | 13 | 10 | 3 | 13 | 10 | 4 | 12 | 13 | 4 | 11 | 10 | 6 |
| Yield Point, lb/100$^2$ | 13 | 15 | 2 | 14 | 17 | 2 | 16 | 14 | 1 | 24 | 25 | 5 |
| 10 Sec gel, lb/100$^2$ | 6 | 7 | 0 | 6 | 7 | 1 | 8 | 8 | 1 | 9 | 9 | 2 |
| 10 Min gel, lb/100$^2$ | 9 | 10 | 1 | 9 | 9 | 2 | 11 | 10 | 2 | 12 | 11 | 4 |
| PH | 11.6 | 11.5 | 11.4 | 116 | 11.5 | 11.4 | 11.5 | 11.2 | 11.1 | 11.6 | 11.2 | 11.1 |
| API filtrate, Ml | 4.0 | — | — | 3.6 | — | — | 2.8 | — | — | 2.6 | — | — |

Silicic Acid Mud - 1.0 bbl Silicic Acid Base, 5 lb N-DRIL ® HT PLUS, and 1 lb BARAZAN ® D PLUS
Exp. Lub. I - 80% octyl dodecanol/20% SIMULSOL AS-48 ™
HCl (15%) or NaOH was added to the muds when needed to adjust pH to 11.3 to 11.5

TABLE 3

EXP. LUB. I IN 12 lb/gal SILICIC ACID MUD

| Sample | A | A | A | B | B | B | C | C | C | D | D | D |
|---|---|---|---|---|---|---|---|---|---|---|---|---|
| (a) Composition/Test Conditions |||||||||||||
| Silicic Acid Mud, bbl | 1.0 | 1.0 | 1.0 | 1.0 | 1.0 | 1.0 | 1.0 | 1.0 | 1.0 | 1.0 | 1.0 | 1.0 |
| Exp. Lub. I, vol. % | — | — | — | 3 | 3 | 3 | — | — | — | 3 | 3 | 3 |
| Rev. Dust, lb | — | — | — | — | — | — | 25 | 25 | 25 | 25 | 25 | 25 |
| Stirred, min | 15 | 15 | 15 | 15 | 15 | 15 | 15 | 15 | 15 | 15 | 15 | 15 |
| Rolled at 150° F., hr | 0 | 16 | 16 | 0 | 16 | 16 | 0 | 16 | 16 | 0 | 16 | 16 |
| Rolled at 250° F., hr | 0 | 0 | 16 | 0 | 0 | 16 | 0 | 0 | 16 | 0 | 0 | 16 |
| Lubricity Coefficient | 0.24 | 0.25 | Off Scale | 0.08 | 0.97 | 0.17 | 0.24 | 0.27 | 0.26 | 0.20 | 0.19 | 0.12 |
| (b) Properties |||||||||||||
| Fann 35, Temp. ° F. | 120 | 120 | 120 | 120 | 120 | 120 | 120 | 120 | 120 | 120 | 120 | 120 |
| 600 rpm | 71 | 73 | 35 | 77 | 80 | 68 | 99 | 98 | 55 | 96 | 99 | 85 |
| 300 rpm | 50 | 52 | 22 | 53 | 58 | 40 | 69 | 67 | 34 | 67 | 69 | 55 |
| 200 rpm | 41 | 44 | 16 | 44 | 49 | 32 | 55 | 54 | 21 | 53 | 60 | 42 |
| 100 rpm | 30 | 34 | 10 | 31 | 38 | 22 | 40 | 39 | 14 | 39 | 47 | 33 |
| 6 rpm | 10 | 12 | 4 | 11 | 14 | 10 | 14 | 14 | 6 | 14 | 19 | 12 |
| 3 rpm | 8 | 10 | 3 | 9 | 12 | 9 | 12 | 13 | 5 | 12 | 15 | 10 |
| Plastic viscosity, cP | 21 | 21 | 13 | 24 | 22 | 28 | 30 | 31 | 21 | 29 | 30 | 30 |

TABLE 3-continued

EXP. LUB. I IN 12 lb/gal SILICIC ACID MUD

| Sample | A | A | A | B | B | B | C | C | C | D | D | D |
|---|---|---|---|---|---|---|---|---|---|---|---|---|
| Yield Point, lb/100² | 29 | 31 | 9 | 29 | 36 | 12 | 39 | 36 | 13 | 38 | 39 | 25 |
| 10 Sec gel, lb/100² | 8 | 10 | 3 | 9 | 12 | 9 | 12 | 13 | 5 | 12 | 15 | 10 |
| 10 Min gel, lb/100² | 11 | 14 | 5 | 12 | 15 | 12 | 15 | 15 | 8 | 15 | 19 | 12 |
| pH | 11.5 | 11.5 | 11.3 | 11.5 | 11.4 | 11.2 | 11.3 | 11.2 | 11.1 | 11.3 | 11.2 | 11.1 |
| API filtrate, ml | 1.8 | — | — | 2.0 | — | — | 2.0 | — | — | 2.0 | — | — |

Silicic Acid Mud - 0.92 bbl Silicic Acid Base, 5 lb N-DRIL ® HT PLUS, and 1 lb BARAZAN ® D PLUS, 0.5 lb PAC-L ™, 118 lb Barite
Exp. Lub. I - 80% octyl dodecanol/20% SIMULSOL AS-48 ™
HCl (15%) or NAOH was added to the muds when needed to adjust pH to 11.3 to 11.5

TABLE 4

EXP. LUB. I IN 14 lb/gal SILICIC ACID MUD

| Sample | A | A | A | B | B | B | C | C | C | D | D | D |
|---|---|---|---|---|---|---|---|---|---|---|---|---|
| (a) Composition/Test Conditions | | | | | | | | | | | | |
| Silicic Acid Mud, bbl | 1.0 | 1.0 | 1.0 | 1.0 | 1.0 | 1.0 | 1.0 | 1.0 | 1.0 | 1.0 | 1.0 | 1.0 |
| Exp. Lub. I, vol. % | — | — | — | 3 | 3 | 3 | — | — | — | 3 | 3 | 3 |
| Rev. Dust, lb | — | — | — | — | — | — | 25 | 25 | 25 | 25 | 25 | 25 |
| Stirred, min | 15 | 15 | 15 | 15 | 15 | 15 | 15 | 15 | 15 | 15 | 15 | 15 |
| Rolled at 150° F., hr | 0 | 16 | 16 | 0 | 16 | 16 | 0 | 16 | 16 | 0 | 16 | 16 |
| Rolled at 250° F., hr | 0 | 0 | 16 | 0 | 0 | 16 | 0 | 0 | 16 | 0 | 0 | 16 |
| Lubricity Coefficient | 0.35 | 0.34 | Off Scale | 0.18 | 0.15 | 0.17 | 0.34 | 0.32 | Off Scale | 0.23 | 0.20 | 0.16 |
| (b) Properties | | | | | | | | | | | | |
| Fann 35, Temp. ° F. | 120 | 120 | 120 | 120 | 120 | 120 | 120 | 120 | 120 | 120 | 120 | 120 |
| 600 rpm | 140 | 134 | 55 | 128 | 126 | 118 | 154 | 151 | 60 | 149 | 144 | 140 |
| 300 rpm | 95 | 99 | 35 | 90 | 88 | 84 | 103 | 99 | 38 | 101 | 96 | 95 |
| 200 rpm | 80 | 82 | 25 | 82 | 80 | 70 | 87 | 86 | 27 | 86 | 82 | 81 |
| 100 rpm | 59 | 62 | 15 | 60 | 57 | 51 | 66 | 64 | 17 | 67 | 62 | 63 |
| 6 rpm | 19 | 22 | 3 | 19 | 18 | 18 | 22 | 20 | 4 | 22 | 20 | 19 |
| 3 rpm | 18 | 20 | 2 | 18 | 16 | 15 | 20 | 18 | 3 | 19 | 18 | 17 |
| Plastic viscosity, cP | 45 | 35 | 20 | 38 | 38 | 34 | 51 | 52 | 22 | 48 | 48 | 45 |
| Yield Point, lb/100² | 50 | 64 | 15 | 52 | 50 | 52 | 47 | 36 | 16 | 53 | 48 | 50 |
| 10 Sec gel, lb/100² | 19 | 19 | 2 | 18 | 17 | 15 | 20 | 18 | 3 | 19 | 18 | 17 |
| 10 Min gel, lb/100² | 22 | 24 | 4 | 21 | 21 | 19 | 24 | 21 | 5 | 24 | 24 | 20 |
| pH | 11.6 | 11.5 | 11.3 | 11.6 | 11.5 | 11.2 | 11.4 | 11.2 | 11.1 | 11.4 | 11.2 | 11.1 |
| API filtrate, ml | 2.0 | — | — | 2.2 | — | — | 1.8 | — | — | 1.8 | — | — |

Silicic Acid Mud - 0.84 bbl Silicic Acid Base, 5 lb N-DRIL ® HT PLUS, and 1 lb BARAZAN ® D PLUS, 0.5 lb PAC-L ™, 235 lb Barite
Exp. Lub. I - 80% octyl dodecanol/20% SIMULSOL AS-48 ™
HCl (15%) or NAOH was added to the muds when needed to adjust pH to 11.3 to 11.5

TABLE 5

EXP. LUB. 1 & 2 IN SILICIC ACID MUD
Comprising 2% wt. Potassium Carbonate

| Formulation | A | B | C | D | E | F | G | H |
|---|---|---|---|---|---|---|---|---|
| Tap Water, bbl | 0.83 | — | 0.83 | 0.83 | 0.83 | 0.83 | 0.83 | 0.83 |
| 30% wt. Silicic Acid Mud Conc. (density = 1.51), bbl | 0.10 | — | 0.10 | 0.10 | 0.10 | 0.1 | — | — |
| 20% wt. NaCl/5% wt Silicic | — | 0.89 | — | — | — | — | — | — |

TABLE 5-continued

EXP. LUB. 1 & 2 IN SILICIC ACID MUD
Comprising 2% wt. Potassium Carbonate

| Formulation | A | B | C | D | E | F | G | H |
|---|---|---|---|---|---|---|---|---|
| Acid Sol. bbl | — | — | — | — | — | — | — | — |
| BARASIL ®-S, bbl | — | — | — | — | — | — | 0.10 | 0.10 |
| K$_2$CO$_3$, lb | 7 | — | 7 | 7 | 7 | 7 | 7 | 7 |
| BIOZAN ®, lb | 1.5 | — | 1.5 | 1.5 | 1.5 | 1.5 | 1.5 | 1.5 |
| BARAZAN ® D PLUS, lb | — | 0.5 | — | — | — | — | — | — |
| N-DRIL ® HT PLUS, LB | — | 5 | — | — | — | — | — | — |
| PAC-L ™, lb | 2.0 | 0.5 | 2.0 | 2.0 | 2.0 | 2.0 | 2.0 | 2.0 |
| Barite, lb | 109 | 109 | 109 | 109 | 109 | 109 | 109 | 109 |
| Rev Dust, lb | — | — | — | — | 25 | — | — | — |
| Exp. Lub. 1 | — | 0.04 | 0.04 | — | — | — | 0.04 | — |
| Exp. Lub 2 | — | — | — | 0.04 | 0.04 | — | — | 0.04 |
| Prior Art Commercial Fluid | — | — | — | — | — | 0.04 | — | — |
| Initial Lubricity Coefficient | Seized | 0.11 | Seized | 0.14 | 0.16 | 0.40 | Seized | 0.15 |
| Lubricity Coefficient after hot rolling 16 hr at 150° F. | Seized | 0.08 | Seized | 0.16 | 0.19 | 0.38 | — | 0.13 |

BIOZAN ® is a registered trademark of Merck & Co., Inc. in Rahway, New Jersey.

TABLE 6

LUBRICITY COEFFICIENTS FOR EXP. LUB. 1
In Unweighted Silicic Acid Mud

| | Initial | 150° F. | 250° F. |
|---|---|---|---|
| Base Mud | Off Scale | Off Scale | Off Scale |
| Base Mud + 3 vol. % Exp. Lub. 1 | 0.16 | 0.07 | 0.11 |
| Base Mud + Rev Dust (25 lb/bbl) | 0.26 | Off Scale | Off Scale |
| Base Mud + Rev Dust + 3 vol. % Exp. Lub 1 | 0.17 | 0.26 | 0.22 |

Base Mud - 1.0 bbl Silicic Acid Base, 5 lb N-DRIL ® HT PLUS, and 1 lb BARAZAN ® D PLUS
Exp. Lub. I - 80% octyl dodecanol/20% SIMULSOL AS-48 ™

TABLE 7

LUBRICITY COEFFICIENTS FOR EXP. LUB. 1
In 12 lb/gal. Silicic Acid Mud

| | Initial | 150° F. | 250° F. |
|---|---|---|---|
| Base Mud | 0.24 | 0.25 | Off Scale |
| Base Mud + 3 vol. % Exp. Lub. 1 | 0.08 | 0.09 | 0.17 |
| Base Mud + Rev Dust (25 lb/bbl) | 0.24 | 0.27 | 0.26 |
| Base Mud + Rev Dust + 3 vol. % Exp. Lub 1 | 0.20 | 0.19 | 0.22 |

Base Mud - 0.92 bbl Silicic Acid Base, 5 lb N-DRIL ® HT PLUS, and 1 lb BARAZAN ® D PLUS, 0.5 lb PAC-L ™, 118 lb Barite
Exp. Lub. I - 80% octyl dodecanol/20% SIMULSOL AS-48 ™

TABLE 8

LUBRICITY COEFFICIENTS FOR EXP. LUB. 1
In 14 lb/gal. Silicic Acid Mud

| | Initial | 150° F. | 250° F. |
|---|---|---|---|
| Base Mud | 0.35 | 0.34 | Off Scale |
| Base Mud + 3 vol. % Exp. Lub. 1 | 0.22 | 0.18 | 0.15 |
| Base Mud + Rev Dust (25 lb/bbl) | 0.34 | 0.32 | Off Scale |
| Base Mud + Rev Dust + 3 vol. % Exp. Lub 1 | 0.23 | 0.20 | 0.16 |

TABLE 8-continued

LUBRICITY COEFFICIENTS FOR EXP. LUB. 1
In 14 lb/gal. Silicic Acid Mud

| | Initial | 150° F. | 250° F. |
|---|---|---|---|

Base Mud - 0.84 bbl Silicic Acid Base, 5 lb N-DRIL ® HT PLUS, and 1 lb BARAZAN ® D PLUS, 0.5 lb PAC-L ™, 235 lb Barite
Exp. Lub. I - 80% octyl dodecanol/20% SIMULSOL AS-48 ™

TABLE 9

LUBRICITY COEFFICIENTS FOR EXP. LUB. 2
In Silicic Acid Mud w/Potassium Carbonate (No Sodium Chloride)

| | Initial | 150° F. |
|---|---|---|
| Base Mud | Seized | Seized |
| Base Mud + 3 vol. % Exp. Lub. 2 | 0.14 | 0.16 |
| Base Mud + Rev Dust + 3 vol. % Exp. Lub. 2 | 0.16 | 0.19 |

Base Mud - Silicic Acid Base without NaCl, PAC-L ™, Barite
Exp. Lub. II - 80% octyl dodecanol/20% SIMULSOL S1-55 ™

The samples with Exp. Lub. I or II had significantly lower lubricity coefficients than samples without either lubricant, indicating that these lubricants of the invention significantly improved the lubricity of the drilling fluid. Generally, reduction in CoF (Coefficient of Friction) in about the 30–70% range was observed. To arrive at this percentage range of reduction in CoF, the CoF was calculated as follows:

$$\frac{t-u}{t} \times 100 = \% \ CoF \ \text{reduction}$$

where t=treated mud; u=untreated mud. The "seized" readings were greater than or equal to 0.50. In the CoF calculation, "seized" data was treated as 0.50.

Further, comparison of the mud properties in the various systems in the tables shows that the lubricants of the invention did not adversely affect the mud properties. Also, the muds containing the lubricant Exp. Lub. 1, comprising 2-ethylhexylglucoside, passed the Mysid Shrimp environmental impact test commonly used in the industry. Exp. Lub 1 was ineffective in potassium carbonate (substituted for sodium chloride) and thus is believed to either need sodium chloride for effectiveness or to be rendered ineffective in potassium carbonate. Exp. Lub. 2 provides slightly better performance than Exp. Lub. 1, and is effective in the presence of sodium chloride or potassium carbonate. However, Exp. Lub. 2 failed the Mysid Shrimp environmental impact test indicating Exp. Lub 2 may be unsuitable for use offshore. Exp. Lub. 2 is nevertheless believed environmentally suitable for land use.

Although the description of the invention herein has been directed to muds comprising or containing silicic acid, the invention is believed to apply as well to muds comprising or containing silicate or silicates. That is, the lubricant of the invention is believed to also provide lubricity to silicate muds. For example, see column H in Table 5 which indicates good performance in a silicate mud.

The foregoing description of the invention is intended to be a description of preferred embodiments. Various changes in the details of the described composition and method can be made without departing from the intended scope of this invention as defined by the appended claims.

We claim:

1. A method for drilling a wellbore in a subterranean formation wherein said method comprises providing or using an aqueous drilling fluid and a silicic acid lubricant wherein said silicic acid lubricant comprises low solubility alcohol and alkyglucoside and wherein said alkyglucoside is 2-ethylhexylglucoside.

2. A method for drilling a wellbore in a subterranean formation wherein said method comprises providing or using an aqueous drilling fluid and a silicic acid lubricant wherein said silicic acid lubricant comprises low solubility, alcohol and alkyglucoside and wherein said alkylglucoside is a mixture of butyl and hexyl glucosides.

3. A method for drilling a wellbore in a subterranean formation wherein said method comprises employing an aqueous drilling fluid and a silicic acid lubricant wherein said drilling fluid comprises silicic acid and wherein said silicic acid lubricant comprises low solubility alcohol and alkylglucoside.

4. A method for drilling a wellbore in a subterranean formation wherein said method comprises employing a silicic acid based drilling fluid containing a silicic acid mud lubricant and wherein said silicic acid mud lubricant comprises low solubility alcohol selected from the group consisting of 2-octyldodecanol; polyetherglycols; oleyl alcohols; and stearyl alcohols, and further comprises alkylglucoside selected from the group consisting of 2-ethylhexylglucoside, butyl glucosides, hexyl glucosides, alkylglucosides having more than ten carbon atoms in the alkyl chain, and mixtures thereof.

5. The method of claim 4 wherein said alcohol comprises about 40 to about 90 volume percent of said lubricant.

6. The method of claim 5 wherein said alkylglucoside comprises about 10 to about 60 volume percent of said lubricant.

7. A method for lubricating a drillbit or other downhole equipment during well operations wherein said method employs an aqueous based well fluid comprising a silicic acid based mud containing a lubricant comprising a low solubility alcohol and an alkylglucoside.

8. The method of claim 7 wherein said alcohol is selected from the group consisting of 2-octyldodecanol; polyetherglycols; oleyl alcohols; and stearyl alcohols and said alkylglucoside is selected from the group consisting of 2-ethylhexylglucoside, butyl glucosides, hexyl glucosides, alkylglucosides having more than ten carbon atoms in the alkyl chain, and mixtures thereof.

9. The method of claim 8 wherein said alcohol comprises about 40 to about 90 volume percent of said lubricant.

10. The method of claim 8 wherein said alkylglucoside comprises about 10 to about 60 volume percent of said lubricant.

11. The method of claim 8 wherein said lubricant comprises about 80 volume percent 2-octyldodecanol and about 20 volume percent 2-ethylhexylglucoside.

12. The method of claim 8 wherein said lubricant comprises about 80 volume percent 2-octyldodecanol and about 20 volume percent alkylglucoside mixture wherein said alkylglucosides have greater than about 10 carbon atoms in the alkyl chain.

13. A lubricant for drilling fluids comprising silicic acid, silicates, or other silica species wherein said lubricant consists of 2-octyldodecanol and an alkylglucoside mixture comprising alkylglucosides, having more than about 10 carbon atoms in the alky chain.

14. A drilling fluid additive comprising about 80 volume percent low solubility alcohol, selected from the group consisting of 2 -octyldodecanol; polyetherglycols; oleyl alcohols; and stearyl alcohols, and about 20 volume percent alkylglucoside, selected from the group consisting of 2-ethylhexylglucoside, butyl glucosides, hexyl glucosides, alkylglucosides having greater than about 10 carbon atoms in the alkyl chain, and mixtures thereof, wherein said additive improves tho lubricity of said fluid.

15. The additive of claim 14 wherein said additive reduces the friction coefficient of said fluid by at least about 20 percent.

16. The additive of claim 14 wherein said additive reduces the friction coefficient of said fluid in the range of about 30 to about 70 percent or more.

17. A silicic acid mud lubricant for drilling a wellbore in a subterranean formation wherein said lubricant comprises a mixture of about 80 volume percent 2-octyldodecanol and about 20 volume percent 2-ethylhexylglucoside.

18. A silicic acid mud lubricant for drilling a wellbore in a subterranean formation wherein said lubricant comprises a mixture of about 80 volume percent 2-octyldodecanol and about 20 volume percent alkylglucosides having greater than 10 carbon atoms in the alkyl chain.

19. A drilling fluid for use in drilling a wellbore in a subterranean formation wherein said drilling fluid comprises a silicic acid mud base, sodium chloride, and a silicic acid mud lubricant wherein said silicic acid mud lubricant comprises 2-octyldodecanol and an alkylglucoside or alkylglucoside mixture selected from the group consisting of 2-ethylhexylglucoside, butyl glucosides, hexyl glucosides, alkylglucosides having greater than about 10 carbon atoms in the alkyl chain, and mixtures thereof.

20. The drilling fluid of claim 19 wherein said lubricant comprises about 80 volume percent 2-octyldodecanol and about 20 volume percent of 2-ethylhexylglucoside or a mixture of butyl glucosides and hexyl glucosides or a mixture of alkylglucosides having greater than about 10 carbon atoms in the alkyl chain.

21. The drilling fluid of claim 19 wherein the lubricity coefficient of said fluid is less than or equal to about 0.2.

22. The drilling fluid of claim 19 wherein the lubricity coefficient of said fluid is less than or about equal to about 0.26.

23. A drilling fluid for use in drilling a wellbore in a subterranean formation wherein said drilling fluid comprises a silicic acid mud base and a silicic acid mud lubricant wherein said silicic acid mud lubricant comprises about 40 to about 90 volume percent 2-octyldodecanol and about 10 to about 60 volume percent alkylglucoside mixture wherein said alkylglucosides have at least about 10 carbon atoms in the alkyl chain.

24. The drilling fluid of claim 23 wherein said lubricant comprises about 80 volume percent 2-octyldodecanol and about 20 volume percent alkylglucoside mixture.

25. The drilling fluid of claim 23 wherein the lubricity coefficient of said fluid is less than or equal to about 0.2.

26. The drilling fluid of claim 23 wherein the lubricity coefficient of said fluid is less than or about equal to about 0.26.

* * * * *